United States Patent Office 3,434,297
Patented Mar. 25, 1969

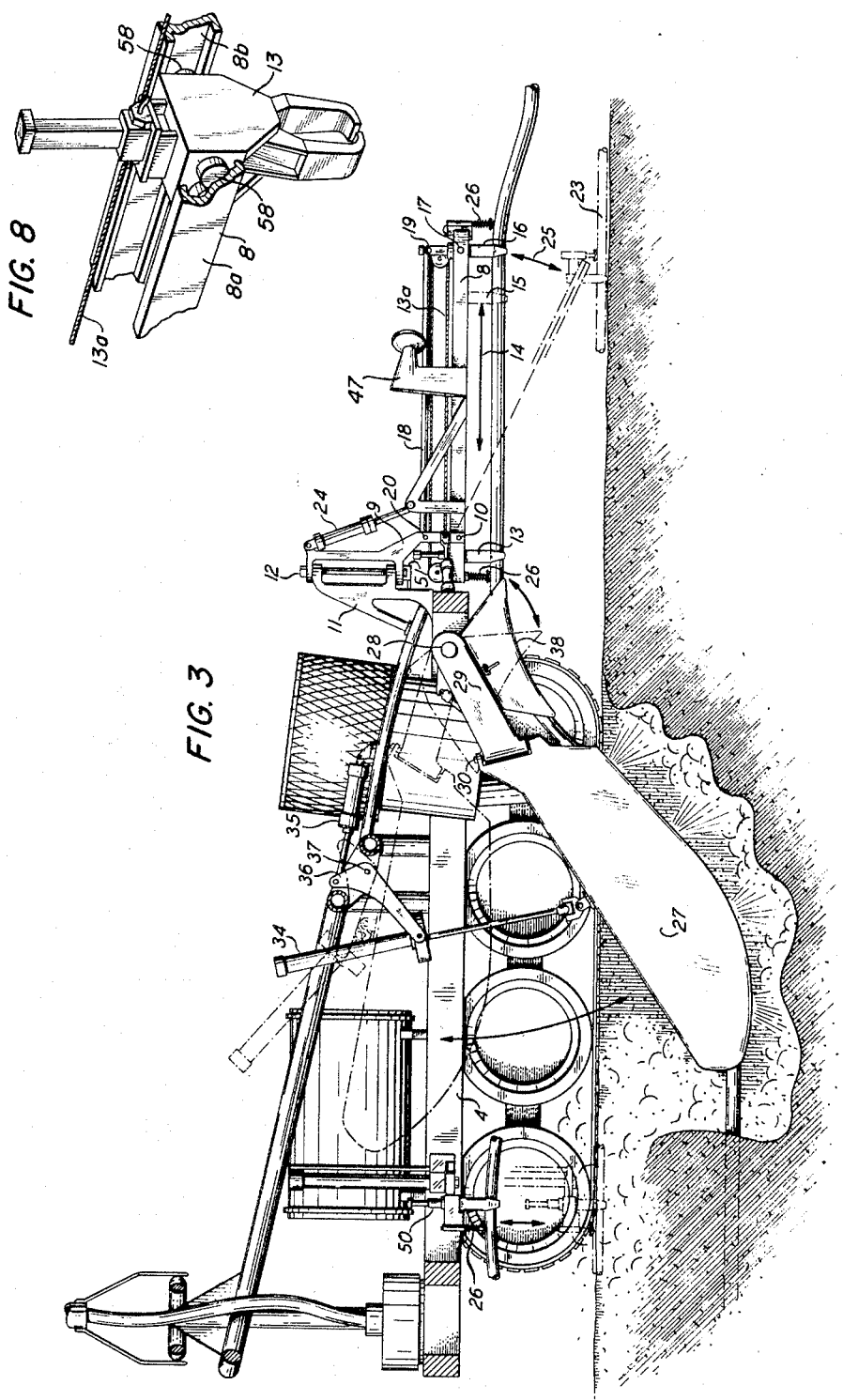

3,434,297
SUBMARINE CABLE BURYING MACHINE
Ralph W. Gretter, Mountainville, Francis J. Spollen, Elizabeth, and Gottfried O. Voigt, Metuchen, N.J., assignors to Bell Telephone Laboratories, Incorporated, Murray Hill, N.J., a corporation of New York
Filed Jan. 25, 1967, Ser. No. 611,766
Int. Cl. F16l 1/00
U.S. Cl. 61—72.4                                          12 Claims

ABSTRACT OF THE DISCLOSURE

A remote controlled ocean cable burying machine features a cable acquisition system with a forwardly-extending boom having two pairs of relatively movable cable-enclosing jaws. Behind the rear jaw is a cable feeder that encloses the acquired cable and lifts it up into the cable entrenching guide in its raised position. Two drive tractors are used to improve traction during steering. A system is shown for automatically steering the tractors along the cable in response to movements of the boom.

---

This invention relates to underwater cable handling equipment and more specifically to a cable handling system in a novel self-propelled ocean cable burier.

Background of the invention

It is increasingly desirable today to bury existing submarine power and communication cables well into the ocean floor wherever large scale fishing activity jeopardizes cables lying on the floor exposed to trawling gear, anchors, clam dredgers and the like. Considerations of working depth and power needs require that burying be performed by highly specialized machines, and a variety of cable burying machines have been built or proposed. In all instances a large measure of shipboard monitoring and control of the machine is necesesary, including stop and go, various cable grasping motions, raising and lowering of the trenching mechanism and others.

In this process of burying existing cable, several operations are especially critical. One of these relates to the initial capture of the cable if the machine is one designed to acquire and thread the cable. The task involves lifting the cable off the ocean floor and positioning it carefully for continuous threading into the entrencher. A further cable handling step is the feeding of the cable into the entrencher which must guide the cable into the trench dug for it. The cable must be guided into the entrencher without undergoing any looping or excessive curvature, i.e., curvature of too small a radius. These conditions must be maintained as the machine advances along the cable. Ensuring correct alignment between cable and entrencher is complicated by the fact that the entrencher and its cable guide must be retractable for several reasons. Additionally, an initial check of alignment between the cable and the entrencher should exist to insure that the machine does not mishandle and damage the cable in trying to bury it.

An additional and highly desirable feature of a cable burying machine is that it be self-steering, i.e., that it sense the lay of the cable as it advances along its path and direct its steering accordingly. Such a steering system should be independent of visibility conditions since jet trenching at low speeds muddies the surrounding waters very substantially.

This invention in essence is a configuration for a cable locating and burying machine that performs the cable capturing, feeding and direction sensing expeditiously and with a substantially reduced risk of damage to the cable.

An object of the invention, accordingly, is to make possible the burying of pre-layed ocean cable.

Another object of the invention is to reduce substantially the risk of damage to the cable during the burying operation.

A more specific object of the invention is to provide for cable capturing and threading in a cable burying machine.

A still further object of the invention is to provide for a visibility-independent self-steering system in a cable burying machine.

Summary of the invention

These and other objects are realized pursuant to the invention, broadly, by a cable burying machine characterized by a body portion with a forwardly extending boom having two pairs of relatively movable cable-enclosing jaws. The forward jaws initially capture and enclose the cable, and the boom is raised. The rear jaws then are moved forward, enclose the cable and return to the rear of the boom. Thus when the boom is raised, the cable is supported from two separate points parallel to the boom. In this way the cable is lifted from the ocean floor and positioned for feeding into the entrencher.

Pursuant to another aspect of the invention, a split duct is located on the body portion directly behind the boom. The duct opens to receive the cable from the rear jaw and thereafter closes and pivots the cable upwardly directly into the guide chute of the retractable entrencher, which is raised to receive the cable. Advantageously, the split duct is further characterized by a support surface having a radius substantially more than the minimum radius of bend to which the cable should be subjected.

An added facet of the invention concerns the dual use of the forward jaws. These guide the cable as described above but also transfer the lateral forces imposed by the cable on the boom. The resulting pivotal movement of the boom is transformed through conventional servo systems into steering commands that direct the machine along the cable's path.

One feature of the invention accordingly concerns relatively movable jaw pairs mounted on a pivotal boom forward of the body section of a cable burying machine, the jaws capturing the cable and maintaining it in a preferred alignment as the machine advances.

Another feature of the invention relates to a means by which the cable thus captured is transferred from the guide jaws to the entrencher accurately and without experiencing excessive curvature.

An added feature of the invention concerns the use of a forward boom to generate continuously steering signals as the machine advances, so that it automatically steers along the cable path.

These and other objects and features of the invention are delineated in greater detail in the description to follow of an illustrative embodiment thereof.

Content of the Drawing

FIG. 3 is a schematic cut away side view of the forward traction member showing the jaws, the entrencher and the transfer mechanism;

*Detailed description*

Figure 1:
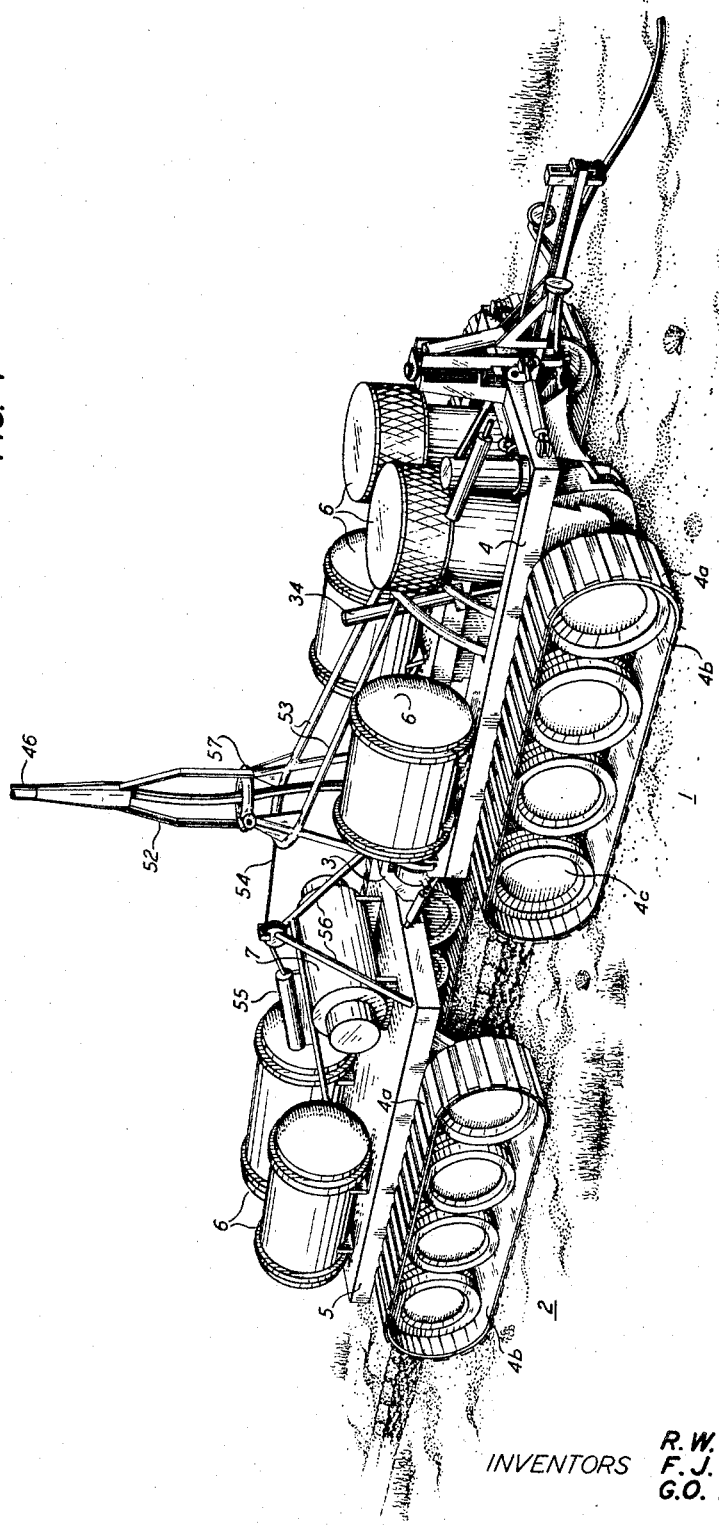
FIG. 1 is a side perspective of an overall cable burying machine embodying the inventive concept.
Figure 2:
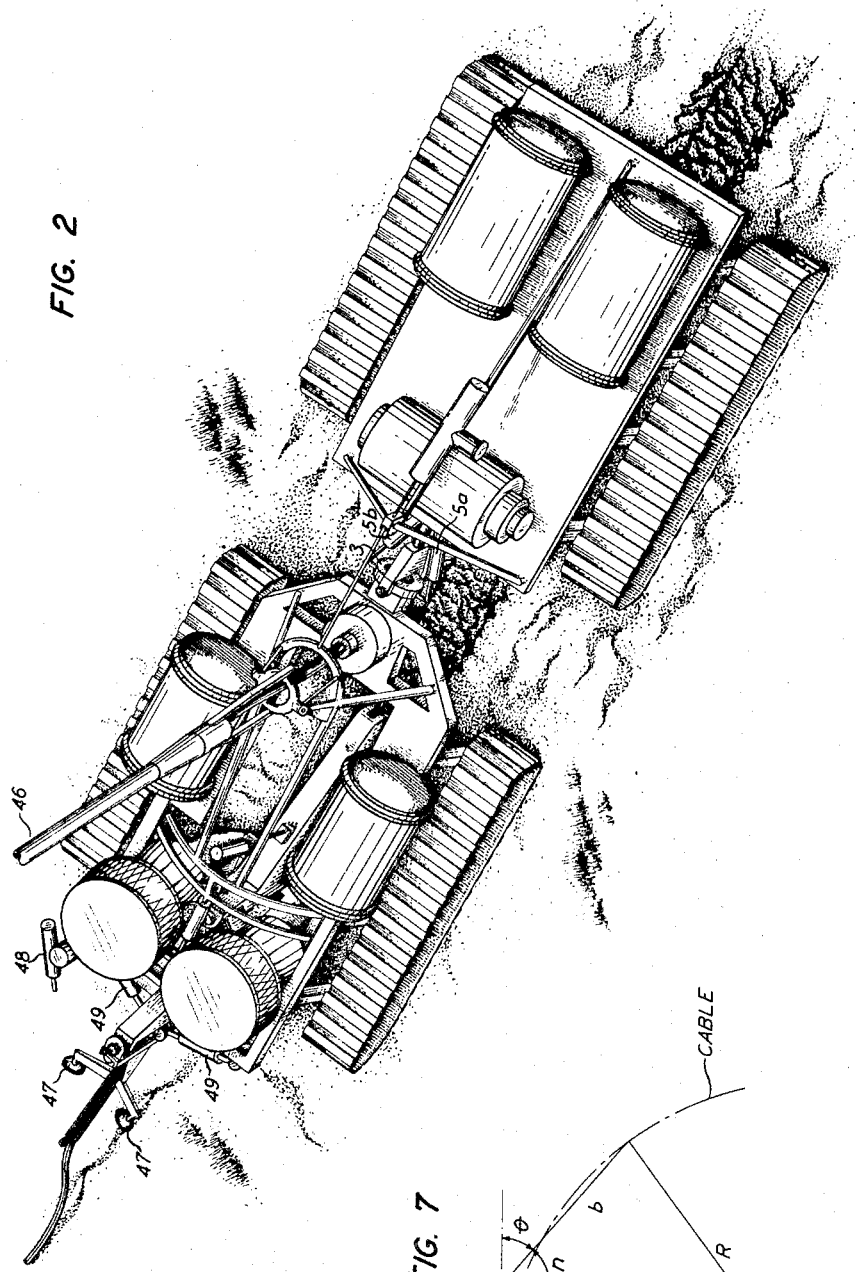
FIG. 2 is a top perspective of such a machine.

FIGS. 1 and 2 depict the overall structure of a cable burying machine incorporating this invention. The machine comprises a forward traction member or tractor 1 and a rear traction member or tractor 2 attached by an articulation or universal joint 3. Tractor 1 has a flat body 4 and tractor 2 has a flat body 5. Bodies 4 and 5 provide a framework for the present invention as well as a station for mounting various items of conventional electrical and hydraulic equipment within the drums designated 6. In this illustrative embodiment, the motive means is by track because the machine described is especially designed for work in sand, silt or gravel bottom.

The track is characteristic of designs used on lightweight vehicles for snow service. Each track consists of grouser assemblies 4a bolted to rubber belts 4b, and runs on four solid rubber tired wheels 4c. Each of the tractors 1, 2, is self-propelled by well-known means in which an electric motor 7 powers a system of hydraulic pumps and motors (not shown) attached to one or more of the wheels 4c of tractors 1, 2. Two self-powered tractors such as shown are preferred because only one such vehicle loses one-half of its power when turning on a curve whereas the combined power of two such vehicles on the same curve is not diminished by that much of a factor. Steering is accomplished by forcing the two vehicles into an angular position by suitable means such as hydraulic cylinders to produce the required force at articulation joint 3. The steering control signals are hereinafter described.

Figure 6:
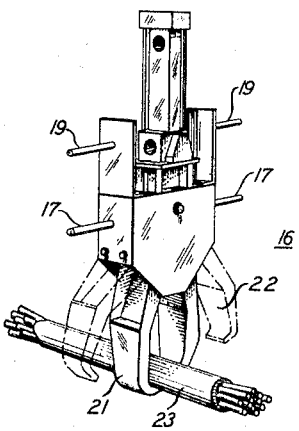
FIG. 6 is a schematic view of the forward jaw.

As seen best in FIGS. 3 and 8, a boom 8 consisting of channels 8a and 8b is mounted to tractor 1 through an arm 9 to which boom 8 is pivotally mounted at pivot 10, and a fixed mount 11 to which arm 9 is attached by rod 12 for movement in a horizontal plane. A rear jaw pair 13 is mounted in some suitable way for traveling movement along the length of boom 8 in the direction shown by arrow 14, from its rearmost position to the phantom position designated 15 at the forward end of boom 8. Rear jaw pair 13 is in essence a traveling cable pickup and guide. Neither the means by which jaw 13 is movably mounted on boom 8 nor the means by which jaw 13 is moved along boom 8 is important, as long as jaw 13 is maintained throughout its travel in a substantially perpendicular attitude to boom 8. In the instant design, jaw pair 13 is mounted on rollers 58 shown in FIG. 8 and is actuated longitudinally by an endless cable 13a driven by a hydraulic motor (not shown). At the forward end of boom 8 is a front jaw pair 16 which, as seen in FIG. 6, is pivotally mounted from pivots 17 at its mid portion to boom 8, and is attached at its top to a rod 18 through its pivots 19. The rear end of rod 18 is attached to arm 9 through pivot 20, as shown in FIG. 3.

FIG. 6 shows the essentials of the grasping structure of rear jaw 13 and front jaw 16 as including opposed arms 21, 22 which open and close through a standard hydraulic actuator in response to signals from the tender ship. Arms 21, 22 must be so constructed that when closed around a cable 23, ample room will remain for the cable to pass through the jaws.

Boom 8 is also attached to arm 9 through a linkage including hydraulic cylinder 24, which raises and lowers boom 8 in the direction of arrow 25. The function of rod 18 is to maintain front jaw 16 generally perpendicular to the ocean bed when boom 8 is lowered, as shown in phantom in FIG. 3, so that when jaw 16 closes around cable 23 the jaw remains vertical during the raising of the boom.

Cable sensors 26 in the vicinity of rear and front jaws 13, 16 are connected by suitable means (not shown) to indicating equipment on the tender ship. Sensors 26 respond to contact with the cable to provide a positive signal that the cable is in fact enclosed in jaws 13, 16.

Figure 5:
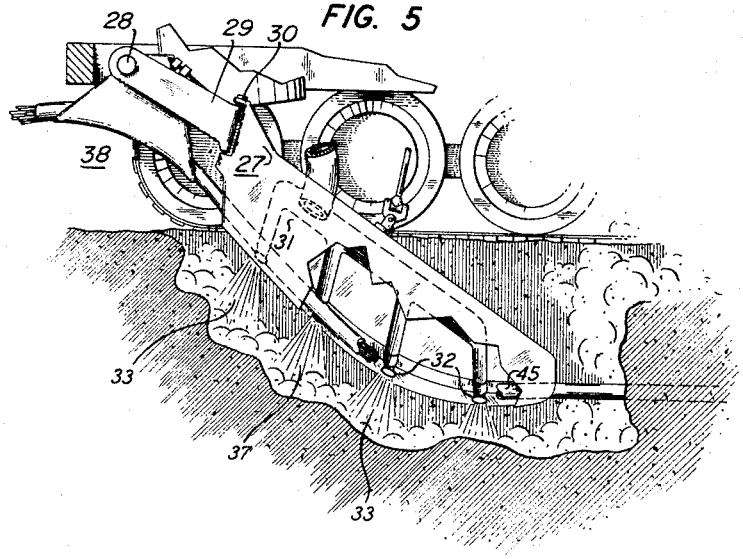
FIG. 5 is a schematic side view showing the entrencher in its lowered position and the cable being fed therethrough.

As best shown in FIGS. 3 and 5, a cable entrencher 27 is pivotally mounted from a depth control pivot 28 in the center of tractor body 4, through a yoke 29, to which entrencher 27 is attached through a tracking pivot 30. Entrencher 27 as illustrated is of the type suitable for work in soft soil such as sand or silt; and as such it has a water jetting system including an interior manifold 31 with a plurality of water nozzles 32, powered by water pumps in well-known fashion to produce water jets 33 which blast a trench for cable 23 as the machine advances along. Entrencher 27 is raised, lowered and adjusted through the combined actions of hydraulic cylinders 34, 35 which are connected at opposite ends of an arm 36 that is pivotally mounted at a fixed point 37 above body 4. This two cylinder system advantageously limits the height of the machine elements that might foul the power and control cable 46.

Figure 4:
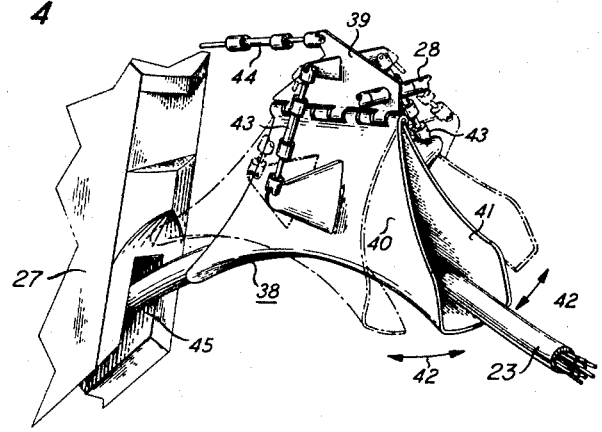
FIG. 4 is a schematic side presentation of a split duct for transferring cable from the rear jaw to the entrencher.

Pursuant to another aspect of the invention, a split duct 38, illustrated in FIG. 4, includes a mounting plate 39 and two side pieces 40, 41 hinged to plate 39. Each side piece 40, 41 includes a convex lower support surface that is formed to a radius larger than the smallest cable bend radius permissible. Side pieces 40, 41 are opened and closed against each other in a direction shown by arrows 42 of FIG. 4, by action of the hydraulic cylinders 43. The open position of split duct 38 is shown in phantom in FIG. 4, and the closed position is also shown in which a cable 23 is being supported. Advantageously, the leading edge of the split duct is flared. Split duct 38 is supported for pivotal movement about depth control pivot 28 and is disposed within the yoke 29. This pivotal motion of split duct 38 within yoke 29 is achieved through a hydraulic cylinder 44 which is attached between the rear end of yoke 29 and the top of mounting plate 39.

Entrencher 27 includes a cable guide or chute 45, shown in FIG. 4 and FIG. 5, suitable for receiving and guiding the cable 23 downwardly and out the back of entrencher 27 into a plowed trench. Split duct 38 thus provides a transition for cable 23 between rear jaw 13 and the guiding action of chute 45. The advantages of this feature of the invention will be noted in the description to follow of the operation of the machine.

The burying machine is lowered from the tender ship by means of cable 46, which provides strength, power supply and telemetry lines. The strength members of cable 46 attach to a frame 52 that attaches pivotally to a trunnion ring 57. Ring 57 is pivotally mounted to a rigid structural steel frame 53 which is a part of body 4 of tractor 1. A similar frame 56 is provided on body 5 and includes a hydraulic cylinder 55 that places a controllable force on a cable 54 which is attached to frame 53. These mechanisms, together with hydraulic cylinders 5a, 5b act to keep the front and rear tractors from folding upon themselves during launching and recovery.

Once on bottom, the floodlights 47 are activated and a television camera 48 relays to the ship a picture of the ocean bottom. The machine is set in motion and eventually encounters the cable. Thereupon the tractors 1, 2 are positioned to straddle the cable so that boom 8 is above and substantially parallel to it. Tractors 1, 2 are stopped and boom 8 is lowered with front jaws 16 opened. A certain amount of pivotal movement in the horizontal plane can be controlled from topside through hydraulic cylinders 49; and jaw 16 thus is placed on the cable and closed. Thereafter boom 8 is raised and rear jaw 13 brought forward along boom 8 to position 15 where its jaws are enclosed around cable 23. Rear jaw 13 then is moved to the after end of boom 8 as portrayed in FIG. 3. Entrencher 27 at this time is in its fully raised position as shown in phantom in FIG. 3. At this point, split duct 38 is rotated to its position shown in solid line in FIG. 3 and its side pieces 40, 41 are enclosed around cable 23.

It is desirable at this point to have a further check that cable 23 is in alignment with the guide 45 of entrencher 27. Accordingly, a third jaw pair 50 is mounted on body 4 of front tractor 1 for vertical movement as shown in FIG. 3. Jaw pair 50 also includes a cable sensor 26 which responds with a signal if the cable 23 is captured within its jaws. Jaw pair 50 thereafter is raised to the position shown in solid line in FIG. 3. The alignment of jaws 50, guide 45 and split duct 38 now is such that if the cable actually is captured in jaws 50 and split duct 38 it necessarily must be in longitudinal alignment with cable guide 45.

With the cable thus disposed in jaws 50 and entrencher 27 in its raised position, split duct 38 is rotated in accordance with the invention in a clockwise direction to its position shown in phantom n FIG. 3. As further shown in FIG. 4, this rotated position presents the cable directly into the entrance of chute 45. Entrencher 27 is now lowered with water spraying under high pressure from its nozzles 32. During the lowering of entrencher 27, split duct 38 maintains its position with respect to chute 45. Both tractors now advance along the path of the cable and burying is performed.

Advantageously entrencher 27 is allowed a movement of plus or minus several degrees with respect to yoke 29. This allows for the fact that entrencher 27 in advancing does not follow a straight line in its movement but rather takes a path of least resistance somewhere within the confines of the machine. It is well, therefore, to allow entrencher 27 some leeway. As a result, less of its lateral movement will be transmitted to its supporting tractor and accordingly tractor 1 is freer to respond to the steering directions of boom 8. This is especially true when the vehicle traverses a curve.

Pursuant to a further aspect of the invention, as the tractors 1, 2 with forwardly extending boom 8 advance along the path of cable 23 any curvature in the cable's path in a horizontal plane will produce a lateral force on jaw 16 which produces deflections of boom 8 around its horizontal pivot pin 12. The extent of this deflection can readily be registered on some suitable device such as, for example, potentiometer 51 shown in FIG. 3 which is attached to mount 11. In such case, the potential across potentiometer 51 varies in accordance with the pivotal movement undergone by boom 8 in following the cable; and this potential in turn may be translated by conventional methods into steering commands. In the present invention, steering is achieved advantageously through articulation joint 3 which varies the angle of advance between the two tractors 1, 2. Pursuant to the invention, this angle at any given time is so governed by the steering signals as to direct the boom along the cable's path and above the cable insofar as possible.

Persons skilled in the art will recognize that considerations such as boom length, location of the pivot point, and relationship of potentiometer voltage to boom angle must be taken into account in designing a particular steering system which, as taught by this invention, is responsive to lateral movements of a forward boom.

Figure 7:
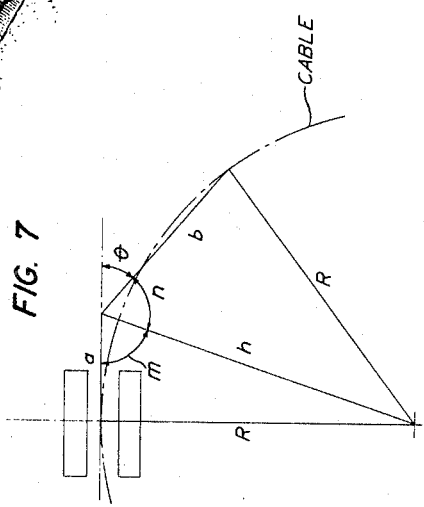
FIG. 7 is a schematic diagram of certain steering geometry.

FIG. 7 represents a schematic plan view of a self-propelled burier which uses a boom-type tactile tracking system. The two long, narrow rectangles represent the contact area of the vehicle tracks on the bottom. The boom is assumed to be pivoted on the center line of the vehicle a distance $a$ forward of the centroid of the track pattern. The vehicle is tracking a cable which lies along a circular arc of radius R.

For the geometry of FIG. 7 the relationship between the required radius of curvature of the vehicle track and the angle $\theta$ is given by $$\frac{1}{R} = \frac{2b}{(a+b)^2} \sin \theta$$

For a large radius of curvature, $\theta$ will be small and the approximation $$\frac{1}{R} = \frac{2b\theta}{(a+b)^2}$$

will be valid.

A tracking system designed according to the above equation allows a self-propelled jetter to follow perfectly a cable disposed in a circular arc if the radius of curvature were large compared to $a$ or $b$ and the speed of travel slow enough that the steering system dynamics could be neglected. For cable configurations other than circular arcs, such a tracking system would give tracking errors. In other words, the vehicle would not track the cable in such a way that the centroid of the track pattern would always lie exactly over the cable axis. This comes about because the relationship between the curvature of the vehicle path and the shape of the curve being tracked is governed by a second order differential equation in the general case. For example, when tracking a sinusoidally disposed cable the vehicle path will be sinusoidal but will have a different amplitude and phase. This effect is independent of dynamics and is purely geometrical. However, the term which is analogous to "damping" in the dynamic case is of such a magnitude here that the amplitude ratio will be nearly unity and the phase angle will be small for cable wave forms likely to be encountered.

When the cable burying operation has been completed, the cable is unthreaded from the machine. Entrencher 27 is raised and split duct 38 and rear and front jaws 13, 16 are all opened. This drops the cable back onto the ocean floor, and tractors 1, 2 are backed away to avoid running over the cable unneccessarily.

The hydraulic lines feeding the several hydraulic cylinders have been omitted for simplicity but in practice are, of course, connected in any well-known convenient fashion to the hydraulic pumps contained in the protective drums 6. Similarly, none of the power control and telemetering connections between the electrical and the hydraulic equipment and topside via cable 46 have been shown since as they are not per se essential to an understanding of the invention.

It is to be understood that the above-described arrangements are illustrative of the application of the principles of my invention. Numerous other arrangements may be devised by those skilled in the art without departing from the spirit and scope of this invention.

What is claimed is:

1. A self-propelled submarine cable burying machine comprising:
    a traction member comprising a boom mounted from the forward end thereof;
    first cable grasping means fixedly mounted at the forward underside end of said boom,
    second cable grasping means mounted for movement on said boom underside between the rear end thereof and said first cable grasping means,
    a cable entrencher retractably mounted on said member aft of said boom, said entrencher including a cable guide; and
    means intermediate said entrencher and said boom for acquiring said cable from said second cable grasping means and for feeding same into said cable guide.

2. A submarine cable burying machine in accordance with claim 1 further comprising means for mounting said boom for pivotal movement in a vertical plane and for independent pivotal movement in a horizontal plane, said boom being guidably lowered onto a cable with its first and second grasping means in a forward position and open to acquire the cable, said second grasping means thereafter retracting with said cable to its rear position, said cable thereby being supported in parallel relation to said boom and in alignment with said cable guide.

3. Apparatus in accordance with claim 1 wherein said intermediate means comprises a split duct mounted for pivotal movement in a vertical plane, means for pivoting said duct to a forward position adjacent to said second cable grasping means and for opening said duct to receive said cable, means for closing said duct and for pivoting same to a rear position to lift said cable upwardly and into alignment with said cable guide, the latter being in its retracted position, and means for lowering said entrencher and said split duct in unison to maintain the alignment therebetween.

4. Apparatus in accordance with claim 2, further comprising means responsive to the movements of said boom in a horizontal plane as it follows the cable path for generating steering signals.

5. Apparatus in accordance with claim 4 further comprising pivotal means for allowing a prescribed amount of lateral movement of said entrencher when same is engaged in digging a trench.

6. Apparatus in accordance with claim 5 wherein said first and second cable grasping means each comprises a pair of opposed jaws and wherein said boom further comprises means for maintaining the forward jaw substantially vertical during the raising and lowering thereof.

7. Apparatus in accordance with claim 6, further including a third jaw pair mounted in the rear of said member in longitudinal alignment with said split duct and said cable guide, means for lowering said third jaw pair and for enclosing said jaws around said cable, and means for raising said third jaw pair to bring said cable into more proximate alignment with said cable guide.

8. Apparatus in accordance with claim 7 wherein said first, second and third jaw pairs further comprise means for sensing whether said cable has been enclosed by said jaws.

9. Apparatus for burying submarine cable resting on the ocean floor comprising:
   a traction member comprising a forwardly-extending boom;
   a forward and a rear jaw pair mounted for relative movement with respect to one another along the underside of said boom;
   means for guiding said traction member and boom into straddling alignment with said cable;
   means including said forward jaw pair for grasping said cable and for raising same;
   means including said rear jaw pair for supporting said cable in parallel relation to said boom;
   an entrencher retractably mounted on said traction member aft of said boom for digging a trench, said entrencher including a cable guide; and
   means for receiving said cable from said rear jaw pair and for pivotally feeding same into said cable guide.

10. Apparatus for burying prelaid submarine cable comprising:
   a traction member comprising a pivotally-mounted forwardly-extending boom;
   a first jaw pair fixedly mounted at the front underside end of said boom;
   a second jaw pair mounted on said boom underside for movement between the rear end of said boom and said first jaw pair;
   means for guiding said traction member and boom into straddling alignment with said cable;
   means for lowering said boom with said first jaw pair extended forward, said first jaw pair enclosing around said cable;
   means for raising said boom and for moving said second jaw to said boom forward end, said second jaw also enclosing around said cable and thereafter said second jaw returning to said boom rear end; and
   a trencher pivotally mounted on said body aft of said boom for movement between said engaging position and a retracted position and including a cable guide for receiving said cable from said second jaw pair and for directing same through said trencher and into a prepared trench.

11. Apparatus in accordance with claim 10, further including a rear traction unit, a universal joint coupling between said rear traction unit and said body and means for adjusting the horizontal angle of said rear traction unit with respect to said body.

12. Apparatus for following and burying a prelaid submarine cable comprising:
   tractor means including steering means;
   a boom mounted for pivotal movement at the front end of side tractor means in a horizontal plane and including cable grasping means at the forward end thereof, said boom moving laterally with respect to said tractor in response to the changing lay of said cable;
   means responsive to said boom lateral movement for generating steering signals to control said steering means; and
   means for burying said cable.

References Cited
UNITED STATES PATENTS

| | | | |
|---|---|---|---|
| 2,755,632 | 7/1956 | Hauber et al. | 61—72.4 |
| 3,175,368 | 3/1965 | Tibbits | 61—72.6 |
| 3,326,008 | 6/1967 | Baran et al. | 61—72.5 |

JACOB SHAPIRO, *Primary Examiner.*